(12) United States Patent
Hopfen

(10) Patent No.: US 10,875,438 B2
(45) Date of Patent: Dec. 29, 2020

(54) CUP HOLDER FOR VEHICLE

(71) Applicant: Volvo Car Corporation, Gothenburg (SE)

(72) Inventor: Artur Hopfen, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 89 days.

(21) Appl. No.: 16/368,961

(22) Filed: Mar. 29, 2019

(65) Prior Publication Data

US 2019/0329689 A1 Oct. 31, 2019

(30) Foreign Application Priority Data

Apr. 26, 2018 (EP) ..................... 18169509

(51) Int. Cl.
*B60N 3/10* (2006.01)

(52) U.S. Cl.
CPC ................... *B60N 3/108* (2013.01)

(58) Field of Classification Search
None
See application file for complete search history.

(56) References Cited

U.S. PATENT DOCUMENTS

| | | | | |
|---|---|---|---|---|
| 4,981,277 A | * | 1/1991 | Elwell | B60N 3/102 224/281 |
| 5,445,350 A | * | 8/1995 | Rigsby | B60N 3/102 224/552 |
| 5,897,041 A | * | 4/1999 | Ney | B60N 3/101 224/483 |
| 9,174,799 B2 | * | 11/2015 | Virgen | B29C 45/0001 |
| 2005/0274862 A1 | * | 12/2005 | Takeichi | B60N 3/106 248/311.2 |
| 2007/0221804 A1 | * | 9/2007 | Harshman | B60N 3/103 248/311.2 |
| 2008/0029672 A1 | * | 2/2008 | Ogura | B60N 3/106 248/311.2 |
| 2011/0037287 A1 | * | 2/2011 | Penner | B60N 3/101 296/37.8 |
| 2011/0127308 A1 | * | 6/2011 | Ogura | B60N 3/106 224/545 |
| 2012/0153113 A1 | * | 6/2012 | Voigt | B60N 3/105 248/316.7 |
| 2016/0059762 A1 | * | 3/2016 | Poirier | B60N 2/2866 248/311.2 |

(Continued)

FOREIGN PATENT DOCUMENTS

| | | |
|---|---|---|
| DE | 202014103852 U1 | 9/2014 |
| EP | 2392490 A1 | 12/2011 |
| GB | 2450726 A | 1/2009 |

OTHER PUBLICATIONS

Oct. 25, 2018 European Search Report issue on International Application No. EP18169509.

*Primary Examiner* — Lori L Lyjak
(74) *Attorney, Agent, or Firm* — Clements Bernard Walker; Christopher L. Bernard

(57) ABSTRACT

A cup holder for a vehicle, wherein the cup holder includes: two opposing, fixed side walls; and two opposing, spring-loaded side walls adapted to support a cup, wherein the two opposing, fixed side walls and the two opposing, spring-loaded side walls define a generally cylindrical receptacle adapted to receive the cup. The present invention also relates to a vehicle including at least one such cup holder.

15 Claims, 10 Drawing Sheets

(56) References Cited

U.S. PATENT DOCUMENTS

2016/0280111 A1* 9/2016 Gaudreau, Jr. .......... B60N 2/26
2017/0066358 A1* 3/2017 Vaupotic ............ A47G 23/0216
2018/0251059 A1* 9/2018 Cociuba ................ B60N 3/108

* cited by examiner

CUP HOLDER FOR VEHICLE

CROSS-REFERENCE TO RELATED APPLICATION

The present disclosure claims the benefit of priority of co-pending European Patent Application No. 18169509.9, filed on Apr. 26, 2018, and entitled "CUP HOLDER FOR VEHICLE," the contents of which are incorporated in full by reference herein for all purposes.

TECHNICAL FIELD

The present invention relates to a cup holder for a vehicle. The present invention also relates to a vehicle including at least one such a cup holder.

BACKGROUND ART

Numerous cup holders for vehicles are known in the art.

U.S. Pat. No. 5,087,008, for example, discloses a container holder assembly which includes an inner section with a top wall having an aperture formed downwardly therein and a lower wall between which there is compressibly held four arcuate shaped resilient discs spaced at equal intervals around the periphery of aperture and made of a flexible foam polymeric material for urging against the side walls of a container such as a can to snugly hold a container to the holder.

Other cup holders include two, three or four small supports (or similar) for the cup, as disclosed for example in US2017/0066358, KR20090049217 (A), and US2018/0001811.

SUMMARY

With the currently used small cup holder supports, good forces are hard to achieve due to small surfaces in contact with different cup sizes. Also, the aesthetics or design of such cup holders may be unpleasing.

It is an object of the present invention to provide an improved cup holder, which overcomes or at least alleviates the aforementioned drawbacks.

According to a first aspect of the present invention, there is provided a cup holder for a vehicle, wherein the cup holder includes: two opposing, fixed side walls; and two opposing, spring-loaded side walls adapted to support a cup, wherein the two opposing, fixed side walls and the two opposing, spring-loaded, side walls define a generally cylindrical receptacle adapted to receive the cup.

The present invention is based on the understanding that by providing two relatively large opposed spring-loaded side walls to support the cup rather than (several) smaller supports, a larger area may be in contact with the cup, which reduces forces from support (i.e. the spring-loaded side walls) on the cup. Also, the cup holder can have reduced moving parts, which provides for a larger storage volume. Also, the design of the cup holder may be more pleasant.

'Cup' should here be construed as any receptacle or container for food or beverages, such as a real cup, a can, a bottle, etc.

Each of the two opposing, spring-loaded side walls may have a concave surface intended to face the cup when the cup is received in the generally cylindrical receptacle. The concave surfaces of the two opposing, spring-loaded side walls can snugly support a cylindrical cup.

Each of said surfaces may have an arc length of at least 30 mm. For optimal contact with the cup, the arc length may be in the range of 35-50 mm, such as 47 mm.

Each of said surfaces may extend along at least 10% of the circumference of the generally cylindrical receptacle (the circumference being in level with the top of said surfaces). For optimal contact with the cup, the extent of each surface relative to the circumference of the generally cylindrical receptacle may be in the range of 10-20%, such as 17%.

Each of said surfaces may extend, and be exposed to the cup, from the bottom of the generally cylindrical receptacle up to a height in the range of 50-70 mm, such as 60 mm.

The two opposing, spring-loaded side walls may be movable between inner and outer positions, wherein the two opposing, spring-loaded side walls are biased towards the inner position by spring loading means of the cup holder. The spring loading means may for example be at least one torsion spring.

The surfaces of the two opposing, spring-loaded side walls may in the inner position form parts of a right open cylinder of the generally cylindrical receptacle. This is suitable for a smaller cup.

The surfaces of the two opposing, spring-loaded side walls may in the outer position be flush with the two opposing, fixed side walls, wherein the surfaces of the two opposing, spring-loaded side walls in the outer position together with the two opposing, fixed side walls form a tapered open cylinder of the generally cylindrical receptacle. This is suitable for a larger cup or for general storage. Also, a uniform and nice-looking inside of the generally cylindrical receptacle may be provided.

The cup holder may further include locking means adapted to lock the two opposing, spring-loaded side walls in the outer position. In this way, a larger storage volume may be provided. The locking means may for example be a snap-fit mechanism including a push-button for undoing or releasing the snap-fit, i.e. undoing or releasing the locking. The push-button may protrude into the generally cylindrical receptacle through an opening in one of the two opposing, fixed side walls when the two opposing, spring-loaded side walls are locked in the outer position, for easy access by a user or for automatic release by a large cup.

The spring loading means may include a first spring connected to the two opposing, spring-loaded side walls and a second spring connected to the two opposing, spring-loaded side walls, wherein the first spring is arranged opposite the second spring. The first and second springs can have the same stiffness. This provides for uniform forces on the cup when it is received in the generally cylindrical receptacle of the cup holder. Alternatively, the first and second springs can have the different stiffnesses. In this way, different parts of the cup holder can have different resilience, which may facilitate placing the cup in the generally cylindrical receptacle of the cup holder. The first and second springs can be torsion springs, for example.

The spring loading means may be arranged above the bottom of the generally cylindrical receptacle.

The two opposing, spring-loaded side walls may be pivotally attached to the bottom of the generally cylindrical receptacle.

The two opposing, spring-loaded side walls may be pivotable about a respective horizontal axis.

At least one of the two opposing, fixed side walls may have an upper recess adapted to accommodate a handle of the cup. In this way, also cups with handles can be properly received.

According to a second aspect of the present invention, there is provided a vehicle including at least one cup holder according to the first aspect. The vehicle may for example be a car (automobile) or a truck.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the present invention, in which.

DESCRIPTION OF EMBODIMENTS

Figure 1A:
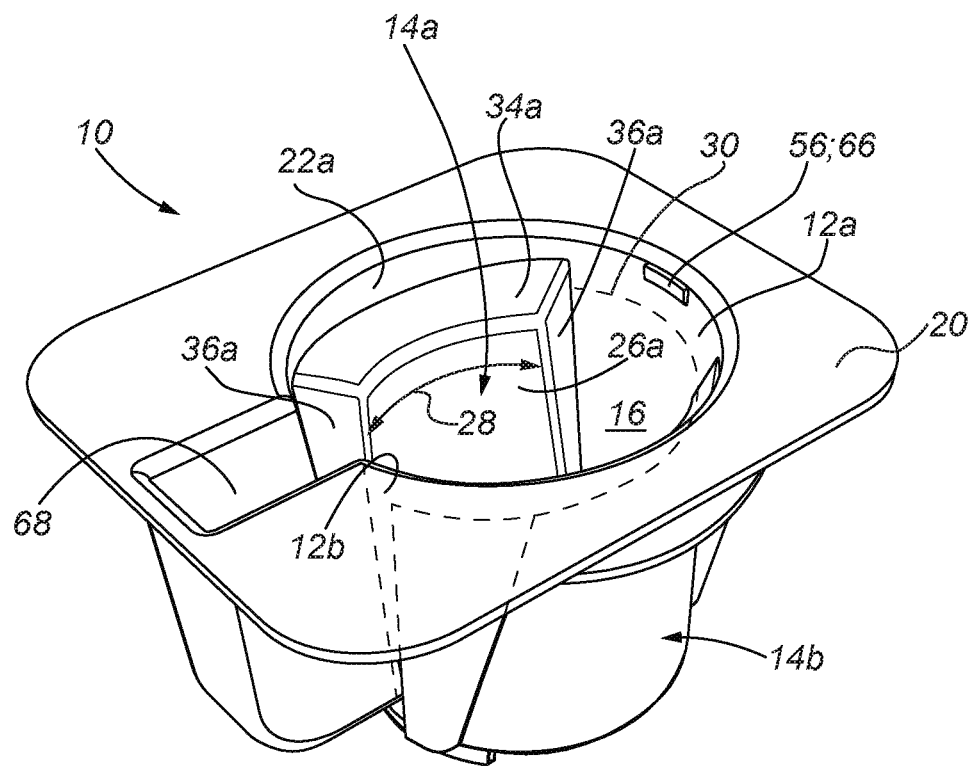
FIGS. 1a-f are perspective views of a cup holder in accordance with an embodiment of the present invention.
Figure 1B:
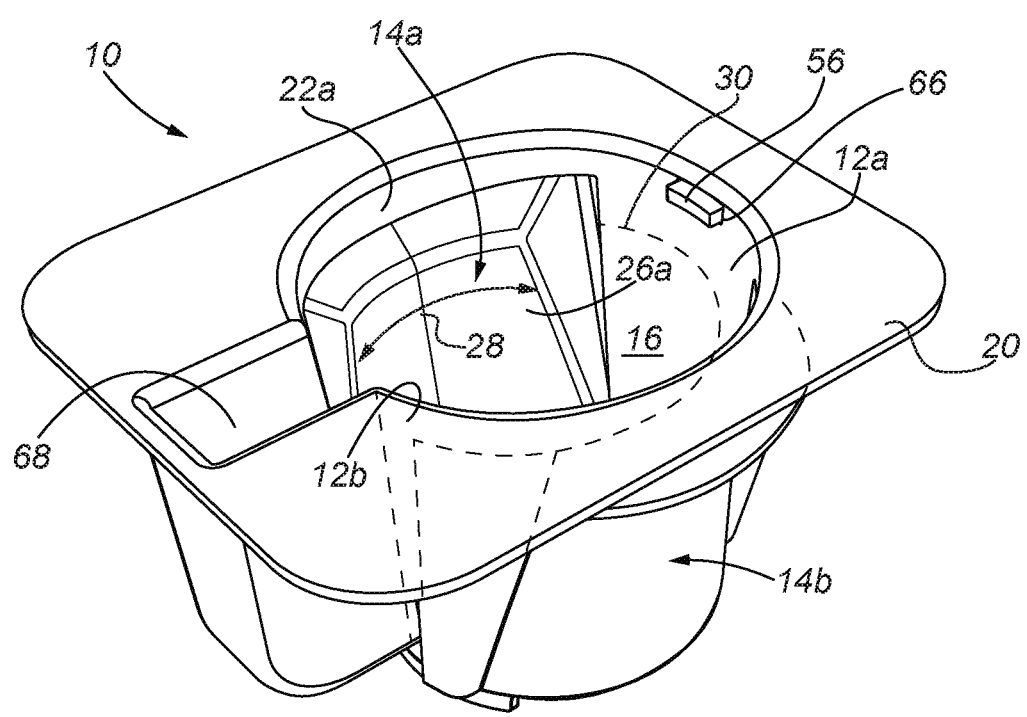

The present invention will now be described more fully hereinafter with reference to the accompanying drawings, in which exemplary embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

A cup holder 10 according to one or more embodiments of the present invention is shown in drawings.

Figure 1C:
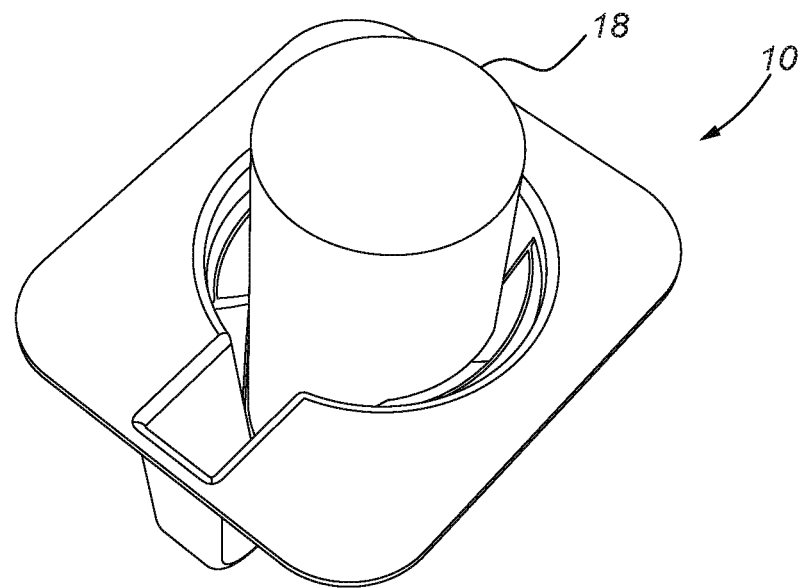
Figure 1D:
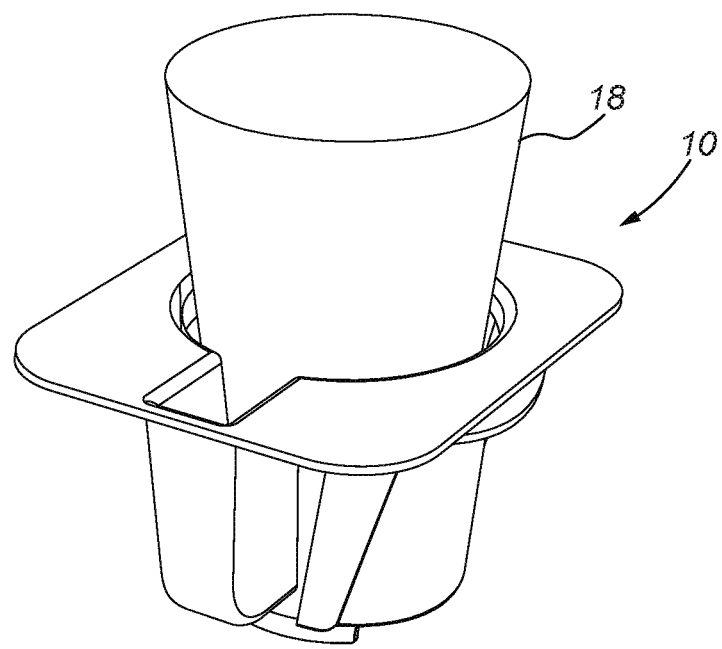

The cup holder 10 includes two opposing, fixed side walls 12a-b and two opposing, spring-loaded (movable) side walls 14a-b. The side walls 12a-b and 14a-b together define a generally cylindrical receptacle 16 adapted to receive a cup 18 (see FIGS. 1c-d). That is, circumferentially, every other side wall is fixed and every other side wall is spring-loaded. The cup 18 should here be construed as any receptacle or container for food or beverages, such as a real cup, a can, a bottle, etc.

The cup holder 10 may further include a top surface 20 with a circular opening, which top surface 20 connects to the two opposing, fixed side walls 12a-b. The cup holder 10 may further include two opposing rims 22a-b arranged between the top surface 20 and the two opposing, spring-loaded side walls 14a-b. The cup holder 10 may further include a bottom 24 of the generally cylindrical receptacle 16, which bottom 24 is arranged opposite the circular opening of the top surface 20. The bottom 24 may be covered by a rubber mat (not shown).

The two opposing, fixed side walls 12a-b and the two opposing, spring-loaded side walls 14a-b of the cup holder 10 can be made of a plastic material, such as ABS (Acrylonitrile Butadiene Styrene) or PC/ABS (Polycarbonate/ Acrylonitrile Butadiene Styrene). Also the top surface 20, the two opposing rims 22a-b, and the bottom 24 can be made of a plastic material, such as ABS or PC/ABS. The two opposing, fixed side walls 12a-b, the top surface 20, the two opposing rims 22a-b, and the bottom 24 can be made in one piece. The aforementioned parts or portions of the cup holder 10 can for example be manufactured by injection molding or 3D printing.

The two opposing, spring-loaded side walls 14a-b are adapted to support the cup 18, so that the cup 18 does not fall when received in the generally cylindrical receptacle 16. The two opposing, spring-loaded side walls 14a-b may be adapted to support the cup 18 by clamping or holding the cup 18, or by serving as delimitations preventing the cup 18 from moving too much, depending on the size and/or shape of the cup 18.

Figure 4A:
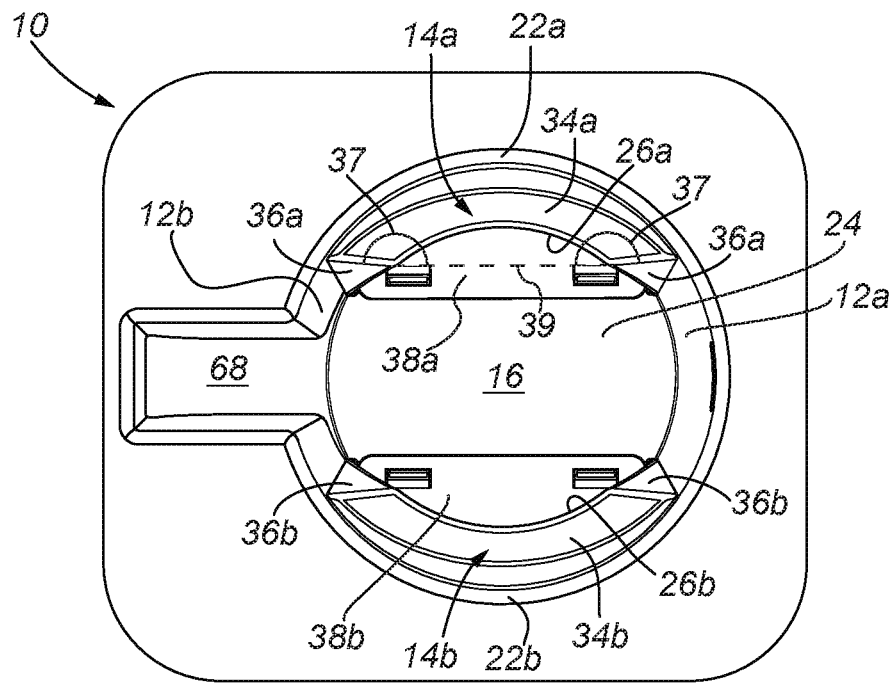
FIGS. 4a-b are top views of the cup holder of FIGS. 1a-b.
Figure 4B:
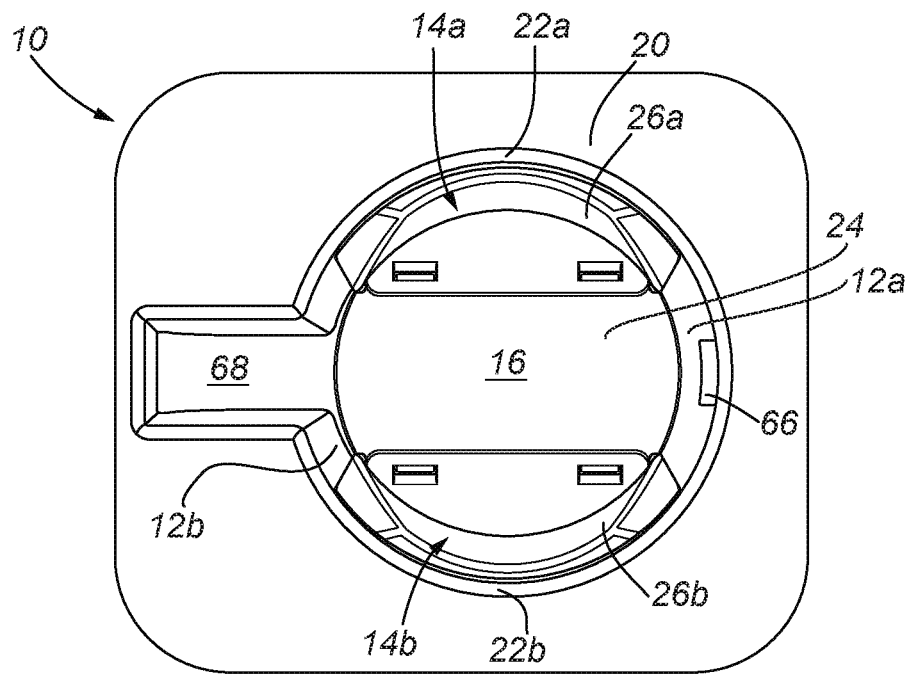

Each of the two opposing, spring-loaded side walls 14a-b may have a concave surface 26a-b intended to face the cup 18, when the cup 18 is received in the generally cylindrical receptacle 16 of the cup holder 10. The illustrated concave surfaces 26a-b are curving in about a longitudinal axis of each spring-loaded side walls 14a-b, preferably throughout the entire height of the surfaces 26a-b. Each of the concave surfaces 26a-b may have an arc length 28 of at least 30 mm or at least 40 mm. The arc length 28 may be in the range of 35-50 mm, such as 47 mm. Furthermore, each of the concave surfaces 26a-b may extend along at least 10% of the circumference 30 of the generally cylindrical receptacle 16. The extent of each surface 26a-b relative to the circumference 30 may for example be in the range of 10-20%, such as 17%. Furthermore, each of the concave surfaces 26a-b may extend, and be exposed to the cup 18, from the bottom 24 of the generally cylindrical receptacle 18 up to a height 32 in the range of 50-70 mm, such as 60 mm. In addition to the concave surface 26a-b, each of the two opposing, spring-loaded side walls 14a-b may have one or more of a top chamfer 34a-b, side portions 36a-b, and a lower angled tab 38a-b. The top chamfers 34a-b may lean down towards the centre of the generally cylindrical receptacle 16, to facilitate insertion of the cup 18 into the cup holder 10. The side portions 36a-b may be oriented at an angle 37 in the range of 90-180 degrees relative to the chord 39 of the arc (length) 28, see FIG. 4a. The tabs 38a-b may improve the stiffness of the two opposing, spring-loaded side walls 14a-b.

Preferably, the two opposing, spring-loaded side walls 14a-b are movable between inner and outer positions. The inner position is shown in FIGS. 1a, 1c, 1e, 2a, 3a, 4a, and 6a, whereas the outer position is shown in FIGS. 1b, 1d, 1f, 2b, 3b, 4b, and 6b. The inner and outer positions may be extreme positions. Furthermore, the cup holder 10 may include spring loading means 40a-b adapted to bias (i.e. force) the two opposing, spring-loaded side walls 14a-b towards the inner position. It is appreciated that the two opposing, spring-loaded side walls 14a-b may be moved to one or more intermediate positions between the inner and outer positions, depending on the size and/or shape of the cup 18.

Figure 1E:
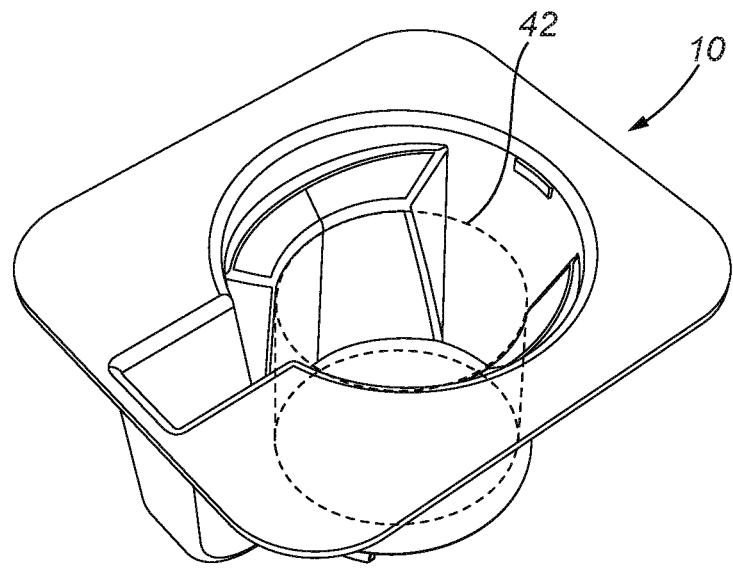
Figure 1F:
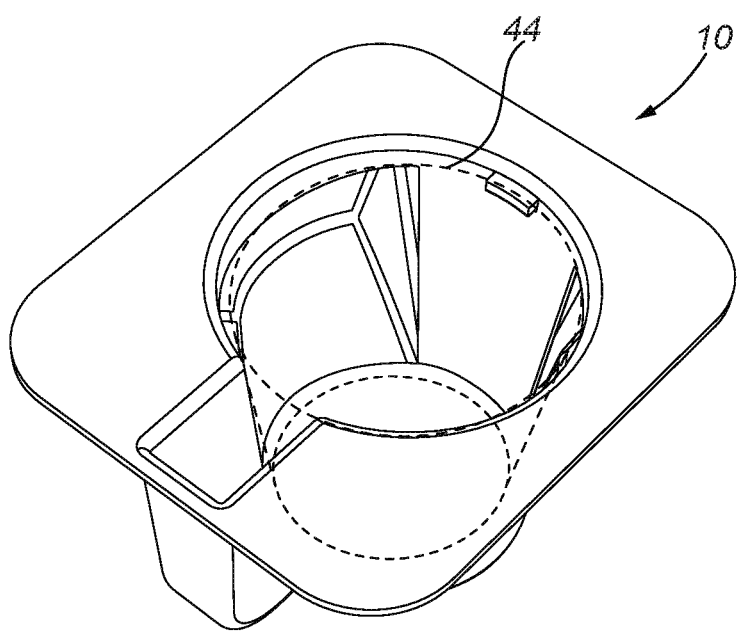
Figure 2A:
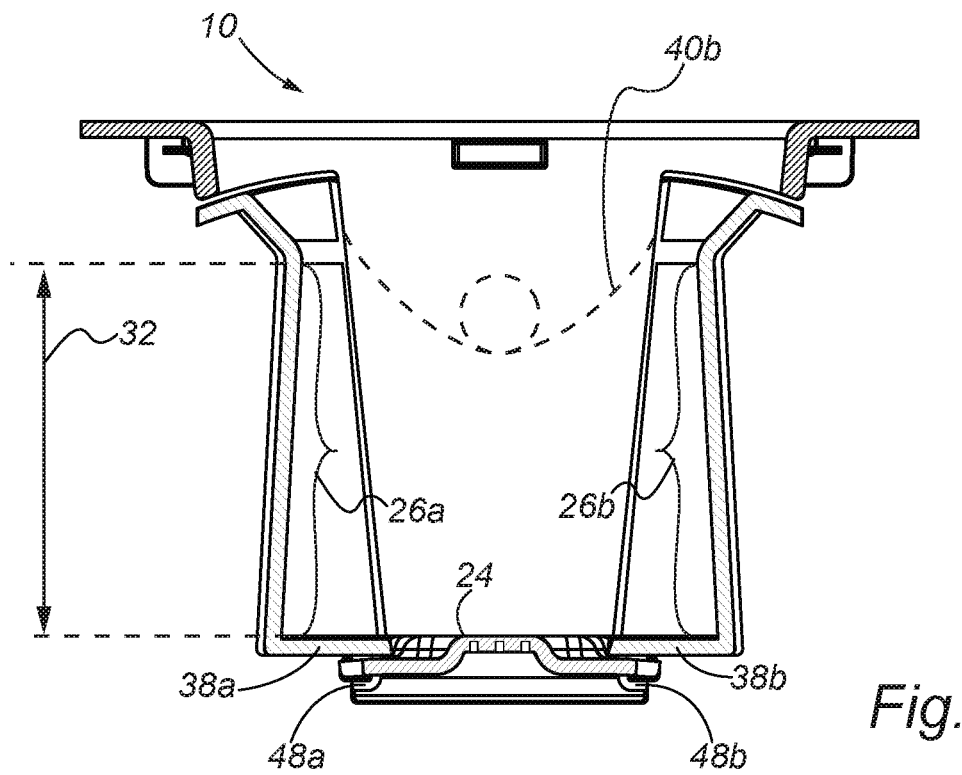
FIGS. 2a-b are cross-sectional side views of the cup holder of FIGS. 1a-b.
Figure 2B:
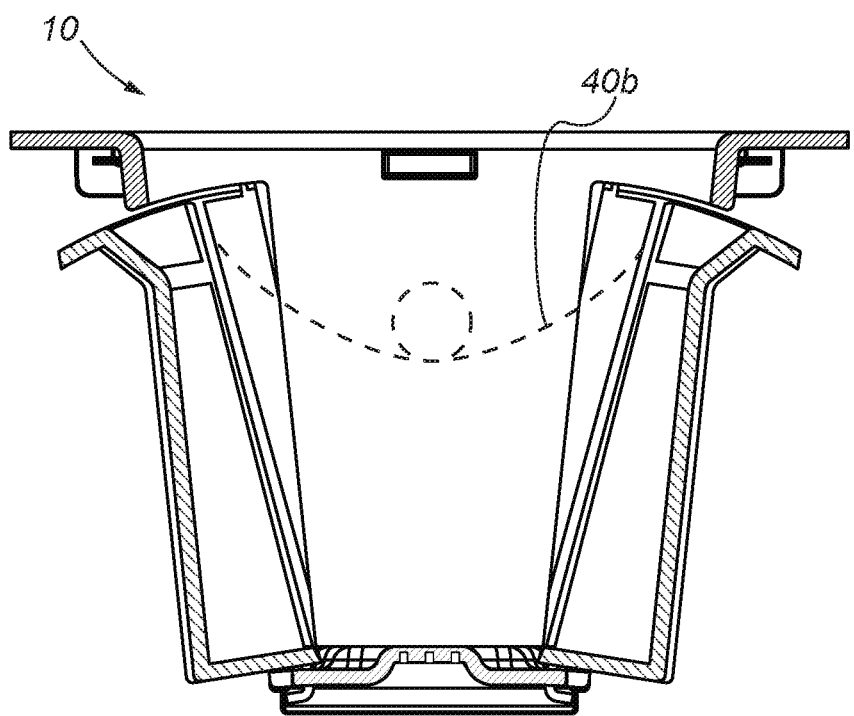
Figure 3A:
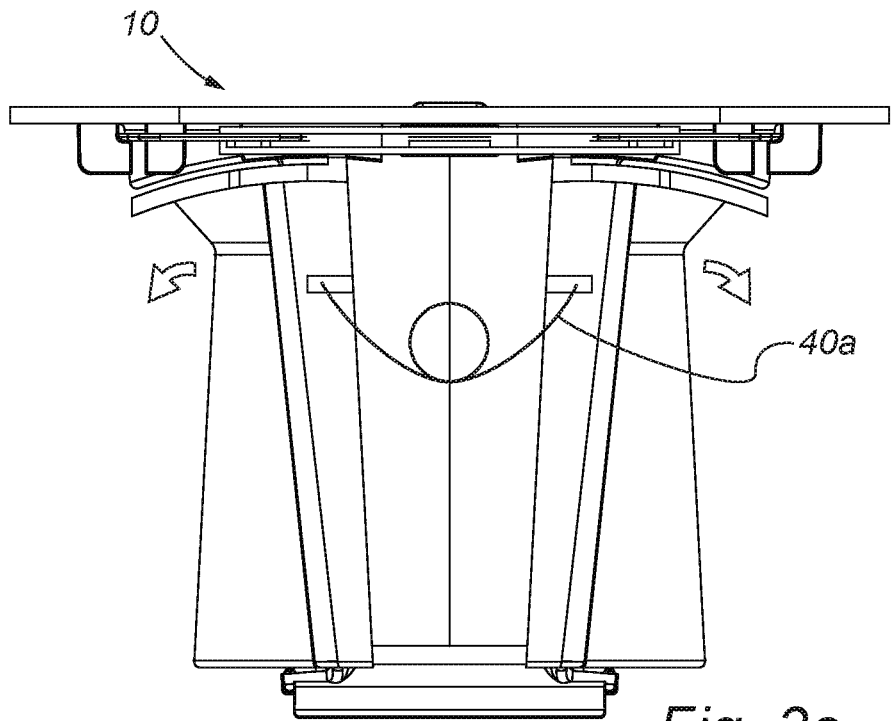
FIGS. 3a-b are side views of the cup holder of FIGS. 1a-b.
Figure 3B:
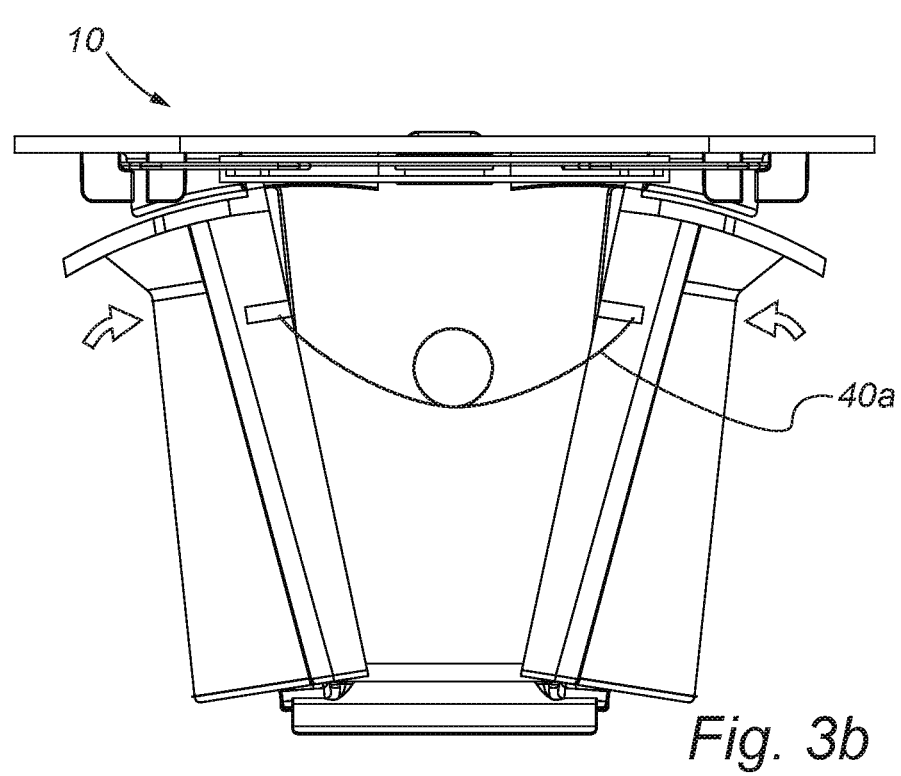

In the inner position, the concave surfaces 26a-b of the two opposing, spring-loaded side walls 14a-b may form parts of a (substantially) right open cylinder 42 of the generally cylindrical receptacle 16 (see FIG. 1e). In the outer position, the concave surfaces 26a-b of the two opposing, spring-loaded side walls 14a-b may be flush with the two opposing, fixed side walls 12a-b. Also in the outer position, the concave surfaces 26a-b of the two opposing, spring-loaded side walls 14a-b may together with the two opposing, fixed side walls 12a-b form a tapered open cylinder 44 of the generally cylindrical receptacle 16 (see FIG. 1f). That is, in this position the generally cylindrical receptacle 16 may have the shape of a tapered open cylinder (as designated by reference sign 44). The tapered open cylinder 44 is wider at the top and narrower at the bottom, like an upside down frustum of a right cone.

The spring loading means 40a-b may include a first spring 40a connected to the two opposing, spring-loaded side walls 14a-b and a second spring 40b connected to the two opposing, spring-loaded side walls 14a-b. The first spring 40a is arranged opposite the second spring 40b. The first and second springs 40a-b can have the same stiffness or different stiffnesses. The first and second springs 40a-b can be torsion springs, for example. The spring loading means 40a-b may be arranged above the bottom 24 of the generally cylindrical receptacle 16, as illustrated in FIGS. 2a-b and 3a-b.

Figure 5:
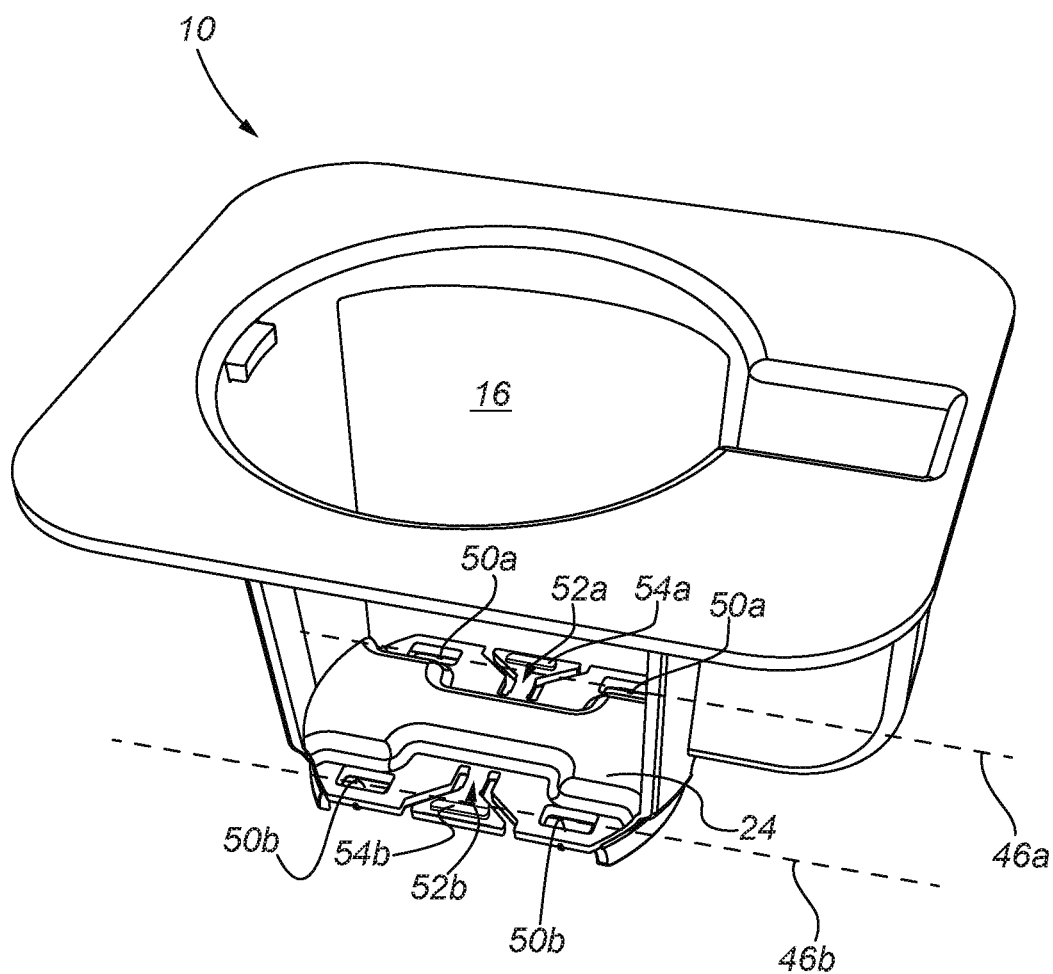
FIG. 5 is partial perspective view of auxiliary spring elements of the cup holder of FIGS. 1a-b.

The two opposing, spring-loaded side walls 14a-b may be pivotally attached to the bottom 24 of the generally cylindrical receptacle 18, so as to be pivotable about a respective horizontal axis 46a-b (in order to move between the inner and outer positions). To this end, each lower angled tab 38a-b of the two opposing, spring-loaded side walls 14a-b may include one or more (here two) hooks 48a-b adapted to engage corresponding openings 50a-b in the bottom 24 of the generally cylindrical receptacle 16, see also FIG. 5. In FIG. 5, the horizontal axes 46a-b are parallel, and the two opposing, spring-loaded side walls 14a-b are not shown.

The bottom 24 of the generally cylindrical receptacle 16 may further include two auxiliary spring elements 52a-b adapted to bias the two opposing, spring-loaded side walls 14a-b towards the aforementioned inner position. Each auxiliary spring element 52a-b may be formed by a cut-out in the bottom 24 between each two openings 50a-b, and the remote end of each auxiliary spring element 52a-b may have an upper ridge 54a-b adapted to engage the underside of the respective lower angled tab 38a-b of the two opposing, spring-loaded side walls 14a-b. The auxiliary spring elements 52a-b may be advantageous when assembling the cup holder 10.

Figure 6A:
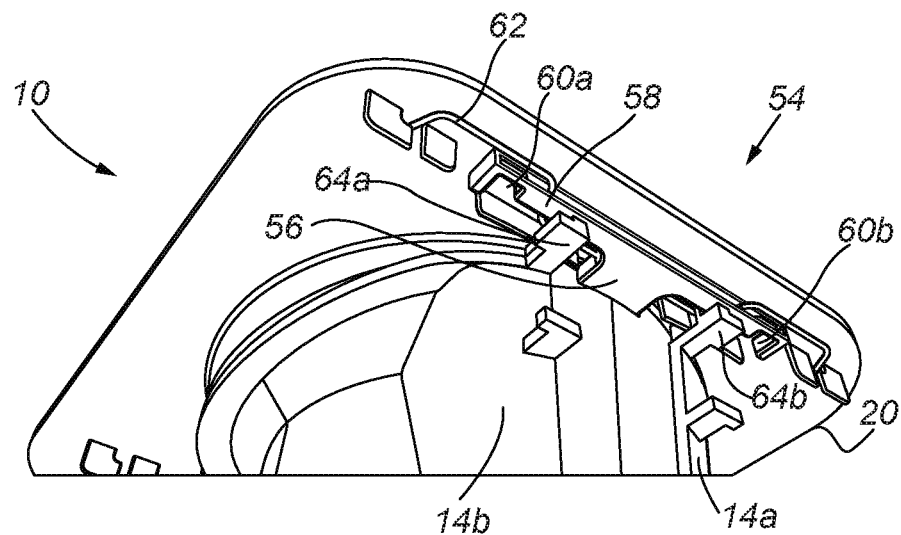
FIGS. 6a-b are partial perspective views of locking means of the cup holder of FIGS. 1a-b.
Figure 6B:
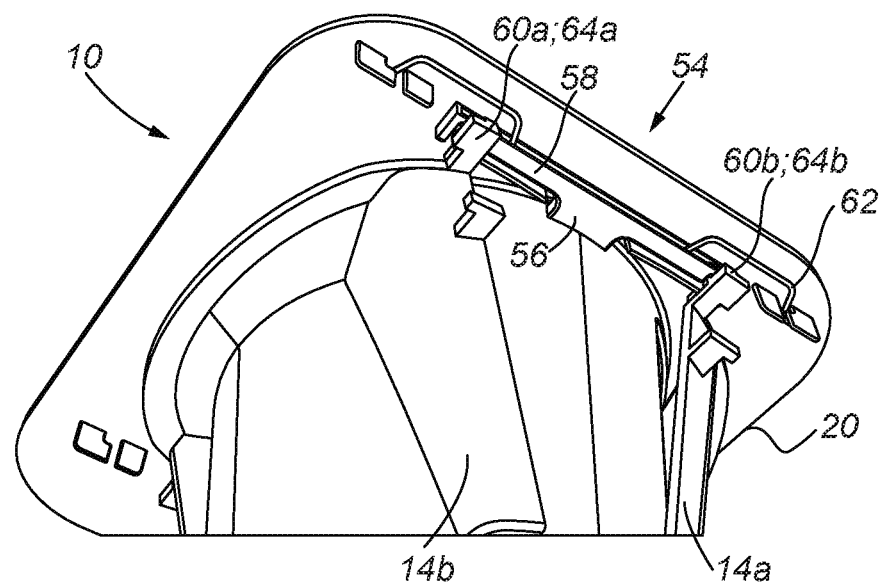

With further reference to FIGS. 6a-b, the cup holder 10 may further include locking means 54 adapted to lock the two opposing, spring-loaded side walls 14a-b in the aforementioned outer position. Here, the locking means 54 is a snap-fit mechanism including a push-button 56 arranged midway on a bar 58 (which bar 58 has a recess 60a-b at each of its ends), a spring 62, and a protrusion 64a-b on each of the two opposing, spring-loaded side walls 14a-b. The locking means 54 may be arranged (just) under the top surface 20. The spring 62 is adapted to urge the bar 58 towards the two opposing, spring-loaded side walls 14a-b. As the two opposing, spring-loaded side walls 14a-b reach the outer position, the recesses 60a-b engage the protrusions 64a-b in snap-fit fashion, to thereby lock the two opposing, spring-loaded side walls 14a-b in the outer position. By pushing the push-button 56 against the spring 62, the locking may be released, whereby the two opposing, spring-loaded side walls 14a-b may return to the inner position. The push-button 56 may protrude into the generally cylindrical receptacle 16 through an opening 66 in one of the two opposing, fixed side walls 12a-b when the two opposing, spring-loaded side walls 14a-b are locked in the outer position. The opening 56 could be extended to the top surface 20, for a better looking design of the push-button 56.

Furthermore, one or both of the two opposing, fixed side walls 12a-b may have an upper recess 68 adapted to accommodate a handle (not shown) of the cup 18. If the cup holder 10 has locking means 54 as described above, the opening 66 for the push-button 56 may be arranged in one of the two opposing, fixed side walls 12a-b, and the upper recess 68 is arranged in the other one of the two opposing, fixed side walls 12a-b. The upper recess 68 is typically extended to the top surface 20, as shown in for example FIGS. 1a-b.

In use, the cup holder 10 may alternately receive cups 18 of different size and/or shape. The two opposing, spring-loaded side walls 14a-b may as a default be in the inner position to support a smaller cup 18, e.g. a 33 cl can, but may move to the outer position or any intermediate position to support a larger cup 18, e.g. a 0.8 L paper cup. When the larger cup 18 is removed, the two opposing, spring-loaded side walls 14a-b may automatically return to the inner position, due to the spring loading means 40a-b. By means of the two opposing, spring-loaded side walls 14a-b, a larger area may be in contact with the cup 18 in comparison to a cup holder having (several) smaller supports, which reduces forces from support (i.e. the spring-loaded side walls 14a-b) on the cup 18.

Figure 7:
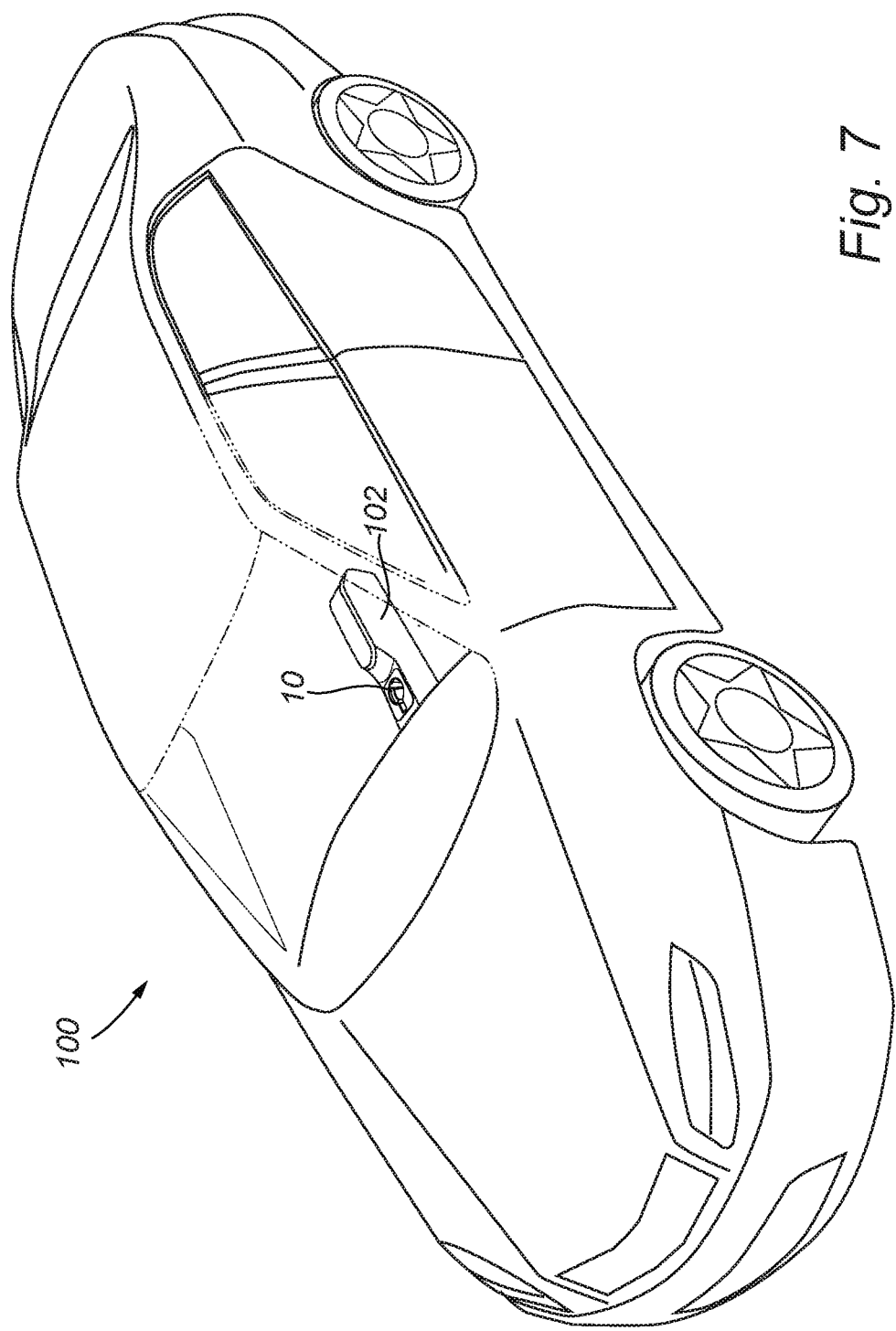
FIG. 7 shows a car including a cup holder in accordance with an embodiment of the present invention.

With reference to FIG. 7, the present cup holder 10 may be arranged in a vehicle 100. The vehicle 100 may be a car (automobile). The cup holder 10, or two such cup holders 10, may for example be arranged in a center console 102 of the vehicle 100. Alternatively or complimentary, at least one cup holder 10 could be arranged in, or in conjunction with, an armrest or an interior side panel of the vehicle 100, for example.

The person skilled in the art will realize that the present invention by no means is limited to the embodiments described above. On the contrary, many modifications and variations are possible within the scope of the appended claims.

The invention claimed is:

1. A cup holder for a vehicle, wherein the cup holder comprises:
   two opposing, fixed side walls; and
   two opposing, spring-loaded side walls adapted to support a cup,
   wherein the two opposing, fixed side walls and the two opposing, spring-loaded side walls define a generally cylindrical receptacle adapted to receive the cup, and
   wherein each of the two opposing, spring-loaded side walls has a circumferential concave surface adapted to face the cup when the cup is received in the generally cylindrical receptacle, wherein each of said circumferential concave surfaces has an arc length of at least 30 mm.

2. The cup holder according to claim 1, wherein each of said circumferential concave surfaces has an arc length of 30-50 mm.

3. The cup holder according to claim 1, wherein each of said circumferential concave surfaces extends along at least 10% of the circumference of the generally cylindrical receptacle.

4. The cup holder according to claim 1, wherein each of said circumferential concave surfaces extends, and is exposed to the cup, from the bottom of the generally cylindrical receptacle up to a height in the range of 50-70 mm.

5. The cup holder according to claim 1, wherein the two opposing, spring-loaded side walls are movable between inner and outer positions, and wherein the two opposing, spring-loaded side walls are biased towards the inner position by spring loading means of the cup holder.

6. The cup holder according to claim 1, wherein the circumferential concave surfaces of the two opposing, spring-loaded side walls in the inner position form parts of a right open cylinder of the generally cylindrical receptacle.

7. The cup holder according to claim 1, wherein the circumferential concave surfaces of the two opposing, spring-loaded side walls in the outer position are flush with the two opposing, fixed side walls, and wherein the surfaces of the two opposing, spring-loaded side walls in the outer position together with the two opposing, fixed side walls form a tapered open cylinder of the generally cylindrical receptacle.

8. The cup holder according to claim 5, further comprising locking means adapted to lock the two opposing, spring-loaded side walls in the outer position.

9. The cup holder according to claim 5, wherein the spring loading means includes a first spring connected to the two opposing, spring-loaded side walls and a second spring connected to the two opposing, spring-loaded side walls, and wherein the first spring is arranged opposite the second spring.

10. The cup holder according to claim 5, wherein the spring loading means is arranged above the bottom of the generally cylindrical receptacle.

11. The cup holder according to claim 1, wherein the two opposing, spring-loaded side walls are pivotally attached to the bottom of the generally cylindrical receptacle.

12. The cup holder according to claim 1, wherein the two opposing, spring-loaded side walls are pivotable about a respective horizontal axis.

13. The cup holder according to claim 1, wherein at least one of the two opposing, fixed side walls has an upper recess adapted to accommodate a handle of the cup.

14. A vehicle comprising at least one cup holder according to claim 1.

15. A cup holder for a vehicle, wherein the cup holder comprises:

two opposing, fixed side walls; and two opposing, spring-loaded side walls adapted to support a cup, wherein the two opposing, fixed side walls and the two opposing, spring-loaded side walls define a generally cylindrical receptacle adapted to receive the cup, wherein each of the two opposing, spring-loaded side walls has a circumferential concave surface adapted to face the cup when the cup is received in the generally cylindrical receptacle, and wherein the circumferential concave surfaces of the two opposing, spring-loaded side walls in the outer position are flush with the two opposing, fixed side walls, and wherein the surfaces of the two opposing, spring-loaded side walls in the outer position together with the two opposing, fixed side walls form a tapered open cylinder of the generally cylindrical receptacle.

* * * * *